No. 614,373. Patented Nov. 15, 1898.
M. DÉRI.
ARRANGEMENT FOR EXCITING MAGNETS OF DYNAMO MACHINES.
(Application filed July 27, 1898.)
(No Model.)
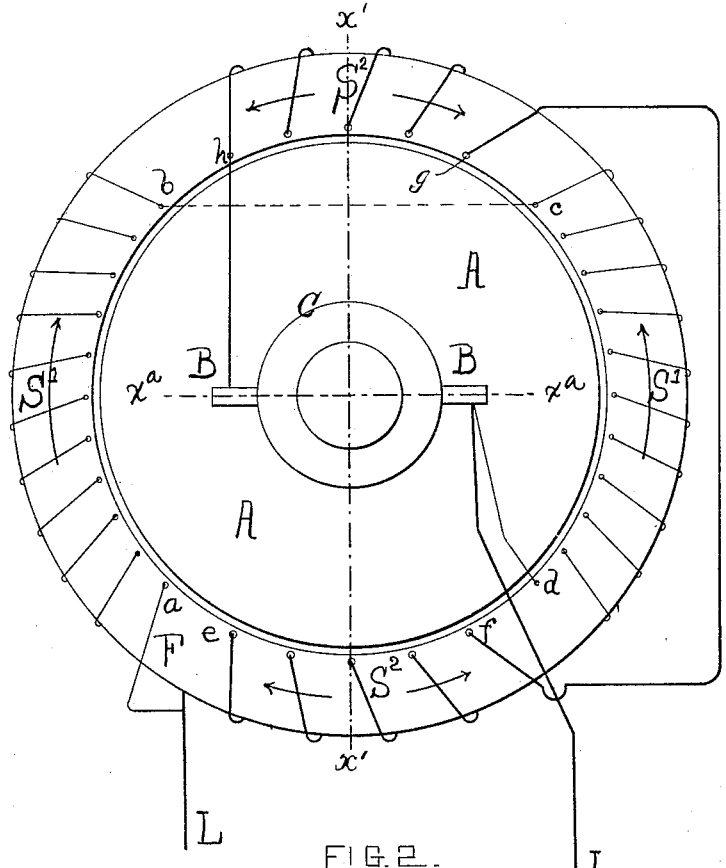
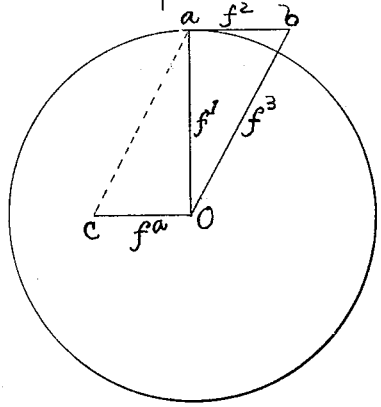
WITNESSES:
INVENTOR
MAX DÉRI
BY
HIS ATTORNEYS

UNITED STATES PATENT OFFICE.

MAX DÉRI, OF VIENNA, AUSTRIA-HUNGARY.

ARRANGEMENT FOR EXCITING MAGNETS OF DYNAMO-MACHINES.

SPECIFICATION forming part of Letters Patent No. 614,373, dated November 15, 1898.

Application filed July 27, 1898. Serial No. 687,026. (No model.)

*To all whom it may concern:*

Be it known that I, MAX DÉRI, engineer, a subject of the Emperor of Austria-Hungary, residing at Vienna, in the Province of Lower Austria, in the Empire of Austria-Hungary, have invented certain new and useful Improvements in Arrangements for Exciting the Magnets of Dynamo-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the excitation of the magnets of dynamo-machines having armatures with commutators in such a way that the resulting field has a constant direction even when the current of the armature, as generator or motor, varies between wide limits or the direction of rotation of the armature changes. In this way sparking at the commutator is avoided when any desired regulation of pressure, current, or speed is made, the brushes being retained in a certain invariable position. For this purpose the field is arranged in the form of a shell or a cylinder (for external or internal pole-machines, respectively) with the iron equally distributed around and equidistant from the armature, similarly to the armatures used in alternate-current induction-motors; but it is not necessary to construct the iron core in laminar form for continuous-current excitation. Pole-pieces or poles of special construction are not used. In contrast with usual field constructions the cross-section of iron and the air-space for the flow of magnetic force are uniform over the whole circumference. The surface of the field-magnet turned toward the armature is wound either in ring or drum windings in two different groups of coils in notches or grooves or through holes.

In the accompanying drawings, Figure 1 is a diagram illustrating the preferred arrangement of circuits, and Fig. 2 is an explanatory diagram.

Fig. 1 shows a field-magnet F (of an external pole-machine) in the form of a shell with ring-winding. A is the armature, C the commutator, and B B the brushes. The coils $S'$ $S'$ form in the series $a\,b$ and $c\,d$ the one winding and are arranged, for example, as a shunt to the brush-circuit which supplies the external leads. The coils $S^2$ $S^2$, which form the second winding $e\,f$ and $g\,h$, are wound in series with the brush-circuit. Both groups of coils are arranged to be bipolar in such a way that the mean poles of the one group are turned half a pole distance from those of the other group, just as in a two-phase winding of an induction apparatus. The layers of wire of both windings can be placed over or near to one another. It is also permissible to wind the coils of one group as ring-windings and those of the other group as drum-windings. The number of windings on the coils $S^2$ $S^2$ is independent of that on the coils $S'$ $S'$. It is advisable to make the number equal or nearly equal to the number of active armature-windings. Both groups of coils act together to excite the field-magnets, the coils $S'$ $S'$ effecting the chief excitation and the coils $S^2$ $S^2$ the compensating excitation, and create a field the axis of which coincides with that of the shunt-circuit field $x'\,x'$ when no current is flowing in $S^2$ $S^2$, but when a current is flowing in $S^2$ $S^2$ is inclined to the axis $x'\,x'$ on the one side or the other at a certain angle dependent on the direction and strength of the current. The coils $S^2$ $S^2$ are so arranged in the main circuit that they excite in the field-armature a flow of magnetic force in a direction contrary to that of the armature-field $x^a\,x^a$, whether the armature operates as generator or as motor. The coils $S^2$ $S^2$ are invariably connected with the armature-circuit, so that the circuits of the armature and the coils $S^2$ $S^2$ are reversed together when the direction of rotation of the armature is altered.

In the diagram Fig. 2 the line $o\,a$ represents in magnitude and direction the field $f'$, excited by the shunt-circuit, and the line $a\,b$ represents the field $f^2$, excited by the compensating coils. Together they constitute the components at right angles to each other of the field $f^3$, which must be regarded as the field created by the sum of the field-exciting coils. This, together with the armature-field $f^a$, (measured by the line $o\,c$,) constitutes the resulting field—that is, the total field of the dynamo-machine—which determines the induction of the rotating armature-windings. If the number of the windings of the compensating coil is made equal to the number of active armature-windings, then, since the current in both always changes equally, $o\,c = -a\,b$, as in Fig. 2, and consequently the total resulting field is always equal to $f'$. According to the arrangement shown in Fig. 1, where the main excitation is effected in the shunt-circuit, the armature at a constant speed of rotation yields a constant pressure and when actuated by a constant pressure develops a uniform speed.

By resistances in the shunt-circuit the strength of the resulting field can be varied as may be necessary. The field, strengthened or weakened in this way, remains, however, in its direction always independent of the variation of the armature-current. The strengthening or weakening of the field can be similarly effected by compound winding the main excitation. In this manner over or under compounding, or even countercompounding, is obtained. All these methods of working are brought about with a constant direction of the resulting field.

When the main excitation-coils $S'\,S'$ are arranged in series with the armature instead of in shunt-circuit, the direction of the resulting field still remains constant, although the strength of the armature-current or the direction of rotation of the armature varies. On the other hand, the strength of the resulting field in such an arrangement may vary within wide limits. Even in this case the compensating coils $S^2\,S^2$, as in Fig. 1, must be coupled in series with the armature, and if a reversal is necessary the armature must remain in unchanged series with the compensating coils and both must have their currents reversed together.

In all the cases mentioned it will be obvious that the neutral zone—that is, the zone in which no induction is exerted on the armature-windings—remains fixed in place, as well as the resulting field-axis, the most essential cause of sparking at the commutator is removed, and the brushes do not spark even when kept in the same position and with large changes of armature-current.

To achieve the desired purpose by this arrangement, it is an important condition that the masses of iron on the armature be equally distributed. Only thus (in contrast with the compensation windings elsewhere proposed for overcoming the reaction) does the flow of force excited by the compensating coils meet with equal magnetic resistance as the flow of force produced by the main excitation-coils. As a result the current in the compensating coils is as effective for excitation of the field as is the current in the main excitation-coils. In this manner the two fields are combined in the desired manner. Contrary to what is the case in the compound field-winding, heretofore usual, the currents in the compensating coils have always a positive effect, since by this current the field in the machine, whether as a generator or as a motor, becomes always stronger, but never weaker. It is thus possible by the arrangement herein described to charge accumulators with compensated armature-currents without fear of a reversal of the poles. It is further possible under equally advantageous working conditions to change the direction of rotation of the dynamo-machine without shifting the brushes.

The arrangements above described for exciting the magnets of dynamo-machines having commutator-armatures are applicable to the different constructions of such machines with any number of poles. This arrangement can also be appropriated in order to avoid the injurious effects of self-induction in armature constructions.

In dynamos for combined alternating and continuous currents (generators, motors, or converters for those combined currents) the series connected compensation winding will obviate self-induction in the circuit of the armature, as the inducing effect of the compensation-coils is contrary to that of the armature-windings.

I claim—

1. In a dynamo-machine having a commutator-armature, a field-magnet arranged around the armature in such a way that the iron of the magnet is equally distributed around and equidistant from the armature, there being two groups of excitation-coils having an equal number of poles and the polar divisions being displaced mutually through half a pole distance, substantially as and for the purpose set forth.

2. A dynamo-machine having field-magnets the iron of which is equally distributed around and equidistant from the armature, with two groups of excitation-coils, one of the two windings exciting a field having a contrary direction to that of the armature-field and being in unchanged series connection with the armature, while the other winding effects the main excitation and is in a shunt-circuit, so that the fields excited commonly by the groups of windings added to the armature-field form a field constant or nearly constant in strength and direction, substantially as and for the purpose set forth.

3. A series motor or generator having field-magnets the iron of which is equally distributed around and equidistant from the armature, with two groups of excitation-coils, one exciting a field having a contrary direction to that of the armature-field and in unchanged series connection with the armature, while the other winding effects the main excitation and may be in changeable series connection with the armature, so that the fields excited commonly by both groups of windings added to the armature-field form a field variable in strength relative to the armature-current, but constant, or nearly constant in direction, even when the direction of rotation is altered, substantially as and for the purpose set forth.

4. A combined alternating continuous-current dynamo (generator, motor or converter) having field-magnets the iron of which is equally distributed around and equidistant from the armature, with two groups of excitation-coils, one in unchanged series connection with the armature, exciting a field having a contrary direction to that of the armature, so that no self-induction arises in the circuit of the armature.

In testimony that I claim the foregoing as my invention I have signed my name in presence of two subscribing witnesses.

MAX DÉRI.

Witnesses:
HENRY C. CARPENTER,
IGNAZ UBLEIS.